Nov. 25, 1958  J. P. CREIGHTON ET AL  2,861,552
POWER TRANSMISSION ARRANGEMENTS FOR HYDRAULICALLY
PROPELLED VEHICLES
Filed Sept. 23, 1957  3 Sheets-Sheet 1
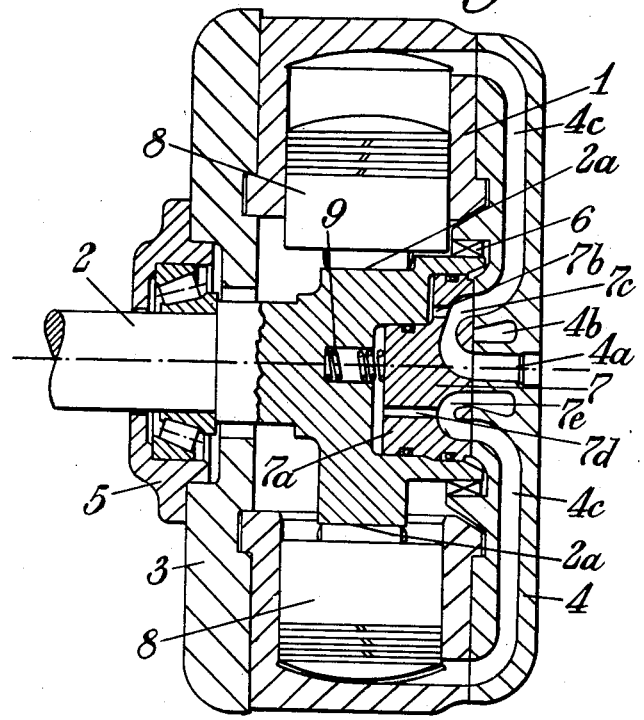
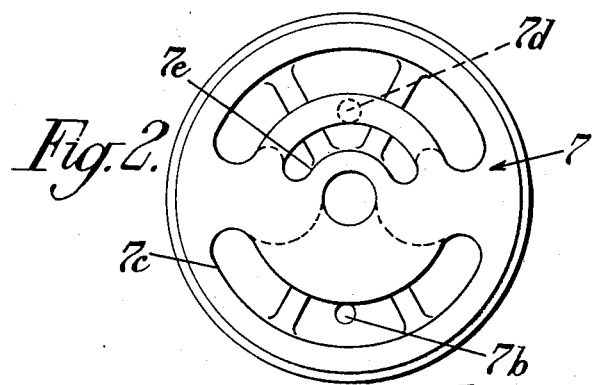
Inventors
J. P. Creighton
D. Mc E. Christie
By Mason Downing Seebold
Attys.

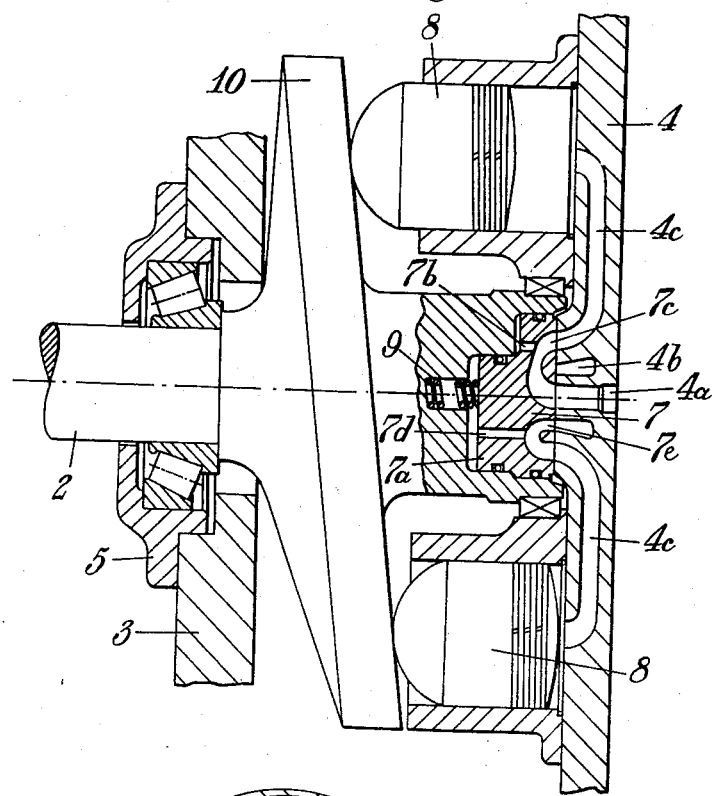
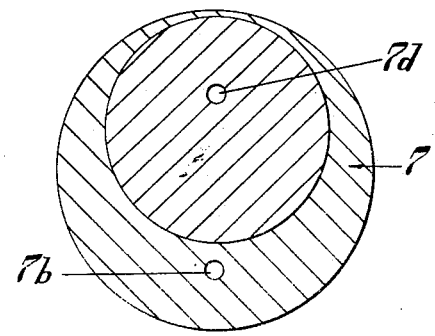

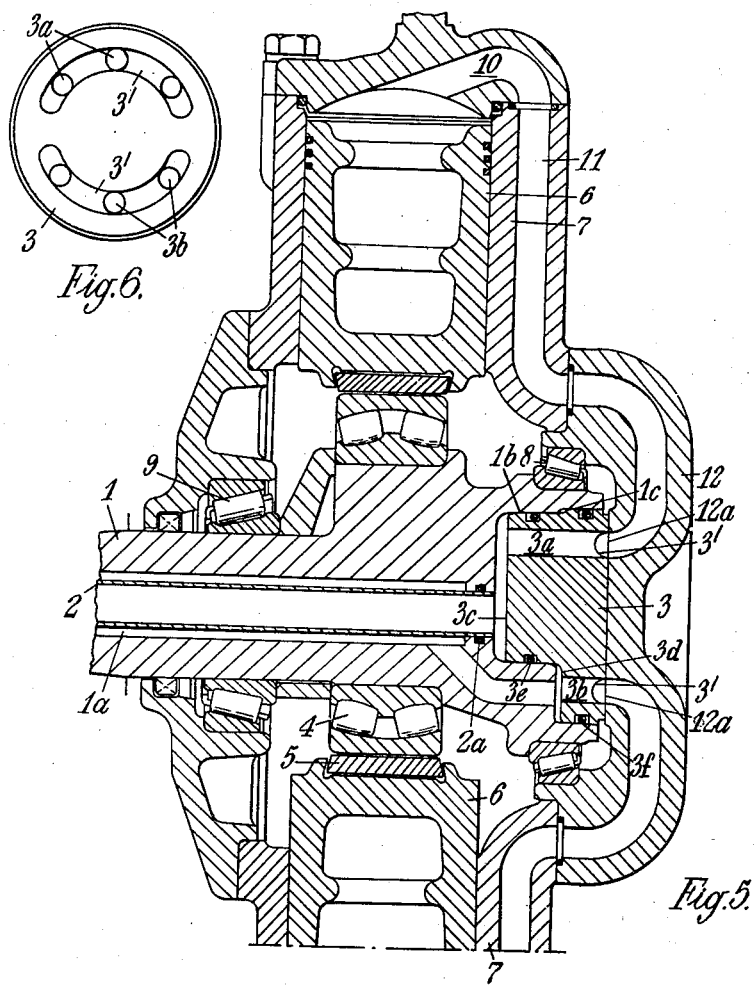

United States Patent Office 2,861,552
Patented Nov. 25, 1958

2,861,552

POWER TRANSMISSION ARRANGEMENTS FOR HYDRAULICALLY PROPELLED VEHICLES

John P. Creighton, Castle Bromwich, near Birmingham, and David M. Christie, Birmingham, England, assignors to Ford Motor Company Limited, London, England Application September 23, 1957, Serial No. 685,529

Claims priority, application Great Britain September 28, 1956

5 Claims. (Cl. 121—119)

This invention relates to hydraulic transmissions.

In hydraulic transmission arrangements particularly of the kind in which the drive is effected by feeding hydraulic fluid sequentially to a plurality of circumferentially spaced pistons and cylinder arrangements, it is necessary to feed the hydraulic fluid to the cylinders over a distribution valve of the kind comprising two mating parts rotating with respect to each other and having ports on their mating faces for transferring the fluid to and from the cylinders in the desired sequential relationship.

The requirement for these parts is that there should be a minimum of friction between the two mating faces consistent with an effective seal to prevent leakage of the fluid therebetween.

To achieve this result one of the two parts has been made axially floating and pressed up against the other by hydraulic fluid pressure applied to the face opposite to the mating face.

To achieve the desired result irrespective of the direction of fluid to the cylinders, i. e. of whether the rotational direction of the drive is forward or reverse, it is necessary to ensure that there shall be a fluid connection to said opposite face from both fluid feed pipes, since either may be used by supplying the hydraulic fluid under pressure to the cylinders while the other is used to provide the connection to exhaust.

In such cases the problem of tilting of the floating part arises.

The present invention consists of a distribution valve of the kind referred to having one of the mating parts axially floating in which said floating part comprises two cylindrical parts in stepped relationship thus providing a floating part in which the opposite face to the mating face is in two sections which are sealed off from each other so that each section is connected to a separate feed (or exhaust) pipe connections, and each section is connected by a passage through the floating part directly to the mating face.

In one construction the two stepped cylindrical parts can be concentric.

In another construction the parts are eccentrically disposed but the forces imposed on the two sections of the faces of the floating part opposite to the mating face are arranged to be balanced at all differences of pressures across the valve so as to prevent tilting and thus reduce leakage rates to a minimum and eliminate uneven wear of the mating faces.

Preferably the floating part is located within the end of the shaft of the hydraulic motor thus enabling the shaft to act as a load reaction member to effect the said balancing of the valve whilst automatically preventing the said floating part from rotating within and independently of the shaft.

In the first embodiment described, the floating part has both received fluid from the feed pipe or cylinders and returned fluid to the cylinders or exhaust pipe respectively at the same mating face. It is possible, however, with the arrangement of the preceding paragraph to supply and remove the fluid through the shaft to and from the sections of the face of the floating part opposite to the mating face.

A distribution valve according to the invention could be applied equally to an hydraulic motor in which the cylinders are caused to rotate and the shaft is stationary or to an hydraulic motor in which the cylinders are stationary and the shaft is caused to rotate.

The invention will be further described with reference to the accompanying drawings in which:

Figure 1 is a section through the axis of a motor having a rotating face valve in accordance with the invention;

Figure 2 is a view of one end of the floating member; and

Figure 3 is a view of the other end;

Figure 4 shows a modification of the arrangement of Figure 1 with the hydraulic cylinders arranged with their axes parallel to the rotational axis instead of being radially disposed in relation thereto.

Figure 5 is an axial section through an arrangement according to the invention;

Figure 6 is a view on the face of the floating part of the distribution valve.

The embodiment of Figures 1, 2 and 3 comprises a plurality of cylinders 1 mounted in circumferentially spaced position with their axes radially disposed in relation to the axis of rotation of a shaft 2. The cylinders 1 are mounted between end plates 3 and 4 which are respectively supported on the shaft 2 by means of a bearing 5, which is a thrust bearing for reasons which will be explained, and a bearing 6.

End plate 4 is formed with an axial passage 4a, an inner circumferential passage 4b and radial passages 4c connecting at the outer ends to passages in the cylinders 1 and at the inner end to floating member 7 of the face valve, to be described.

Pistons 8 operate in cylinders 1 and bear at their inner ends against a cam face 2a on the end of shaft 2.

The floating member 7 of the rotary face valve has an eccentric cylindrical projection 7a at one end, and is housed within a recess in the end of shaft 2, the recess having an eccentric bore to take the projection 7a and a larger diameter bore to take the larger diameter of the floating member 7.

A still further bore in the end of shaft 2 concentric with the larger diameter bore receives a spring 9 which presses against the end of the floating member 7.

Each bore is fluid-sealed from the other by suitable and conventional means such as O rings. Thus at the back of the floating member two independent faces are provided and are arranged as shown in Figure 3 so that the resultant areas of both are equal, and the pressure centre of each area is arranged to be offset from the centre of the shaft by an equal amount, which amount may be determined experimentally.

One of the areas is conveniently connected by a throughbore 7b to the high pressure porting 7c in the floating member, so to connect directly with the high pressure fluid in the system and the other area is also conveniently connected by similar means 7d to the low pressure porting 7e in the system. Thus the high and low pressures which are imposed at one time at the faces of the valve whatever their relative positions rotationally are transferred by way of the said throughbores to the respective areas at the back of the floating member so that the load on the portions of the adjacent faces due to high pressure is counterbalanced by a corresponding load on the respective back face effectively to prevent tilting of the floating member and thus leakage between the faces of the valve is reduced to a minimum. The prevention of said tilting automatically ensures that uneven wear is eliminated.

This valve design also satisfies the requirements of load balancing when the motor is required to be reversible wherein the previous high and low pressure ports are changed to low and high pressure ports respectively.

To obtain the necessary loadings on the back faces of the said floating member it is necessary to locate the shaft 2 in such a way that endwise movement of the shaft under the loads imposed on the said back faces is resisted and suitable means are therefore provided by incorporating a normal type of thrust bearing 5 which can also serve the purpose of supporting the shaft radially. Thus the reaction of the force required to counterbalance the load on the valve faces is transferred by way of the shaft as a thrust force to the said thrust bearing, the shaft remains stationary endwise and the valve is effectively balanced.

Overbalancing, i. e. additional load on the back face areas is found to be necessary at extremely high pressures and this is easily achieved by an adjustment of said areas and/or by the provision of the compression spring 9 located between the end of the shaft and the said cylindrical eccentric projection. This spring also serves to maintain the respective valve faces in contact when extremely low pressures are used or when the transmission is not in use, thus to maintain fluid in the system.

Figure 4 shows a modified embodiment in which the cylinders 1 have their axes disposed parallel to the rotational axis of shaft 2 and the ends of pistons 8 bear against a swashplate 10 formed on adjacent shaft 2.

In the embodiment of Figures 5 and 6 a fixed shaft 1 is provided with a central aperture 1a in which is secured a coaxial tube 2 with a seal 2a.

Shaft 1 is formed at the end with two eccentric bores 1b and 1c and a boring is taken from aperture 1a to the base of bore 1c. Tube 2 extends to the base of bore 1b.

Into the bores there fits a floating part 3 comprising two stepped cylindrical parts eccentric in relation to each other and provided with two arced grooves 3' in the outer face respectively connected to the corresponding rear faces by passages 3a, 3b, as shown in Figure 6.

Shaft 1 is formed with an eccentric part 1d which supports a roller double-thrust bearing race 4 which carries a shoe 5. Around the shoe 5 are disposed circumferentially disposed pistons 6 with their axes radial and operating in associated cylinders 7.

Cylinders 7 are supported on the shaft 1 by roller thrust bearings 8 and 9.

Passages 10 from the heads of the cylinders extend to radial passages 11 which in turn extend to corresponding passages in an end plate 12 which forms the other part of the distribution valve providing a face which mates with the floating part 3.

The passages in the plate 12 extend to ports 12a in the mating face.

The two stepped end faces of floating part 3 namely 3c and 3d are sealed off from each other by seal 3e and the face 3d is also sealed from the outside at seal 3f.

The faces 3c and 3d are arranged as shown at Figure 3 to provide areas with pressure centres disposed on either side of the shaft axis to balance the floating part 3 against tilting.

The remainder of the operating details correspond to the usual cycle of operations with drives of this kind and will be well understood to those skilled in the art.

Various modifications may be made within the scope of the invention.

We claim:

1. An hydraulic transmission arrangement comprising a plurality of circumferentially spaced pistons and cylinders, a distribution valve comprising two parts rotatable with respect to each other on mating faces, one of the parts being axially fixed and having ports in its mating face and fluid passages extending therefrom to the respective cylinders and the other part being axially floating, said other part having on its face opposite to the mating face two axially spaced sections which are sealed from each other and having ports in its mating face cooperating with ports in the axially fixed part and fluid passages extending therefrom to the respective axially spaced sections, and fluid supply and exhaust passages extending to the distribution valve for supplying and exhausting the cylinders through the co-operating ports in the desired sequence.

2. An hydraulic transmission arrangement as claimed in claim 1 in which the fluid supply and exhaust passages extend to further ports in the mating face of the axially floating part connected to the fluid passages therein.

3. An hydraulic transmission arrangement as claimed in claim 1 in which the fluid supply and exhaust passages extend to the respective sealed axially spaced sections of the axially floating part.

4. An hydraulic transmission arrangement as claimed in claim 1 in which the two axially spaced sections are each differently eccentrically disposed in relation to the axis of a shaft which co-operates with the pistons.

5. An hydraulic transmission arrangement as claimed in claim 1 in which the axially floating part is located within the end of a shaft which co-operates with the pistons.

References Cited in the file of this patent

UNITED STATES PATENTS

| | | |
|---|---|---|
| 1,299,477 | Kendall | Apr. 8, 1919 |
| 2,016,802 | Fisk | Oct. 8, 1935 |
| 2,674,197 | Dudley | Apr. 6, 1954 |